(12) United States Patent
Ranpise et al.

(10) Patent No.: US 11,451,634 B2
(45) Date of Patent: Sep. 20, 2022

(54) SYSTEMS AND METHOD FOR USING DCI-ESI TO BUILD HIGHLY SCALABLE EVPN DCI NETWORKS

(71) Applicant: Arista Networks, Inc., Santa Clara, CA (US)

(72) Inventors: Amit Ranpise, San Jose, CA (US); Rajesh Semwal, Sunnyvale, CA (US); Isidoros Kouvelas, Strovolos (CY)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/097,925

(22) Filed: Nov. 13, 2020

(65) Prior Publication Data

US 2022/0150312 A1 May 12, 2022

(51) Int. Cl.
| | |
|---|---|
| *H04L 12/00* | (2006.01) |
| *H04L 67/141* | (2022.01) |
| *H04L 45/74* | (2022.01) |
| *H04L 12/46* | (2006.01) |
| *H04L 12/66* | (2006.01) |
| *H04L 61/50* | (2022.01) |
| *H04L 101/622* | (2022.01) |

(52) U.S. Cl.
CPC ........ *H04L 67/141* (2013.01); *H04L 12/4641* (2013.01); *H04L 12/66* (2013.01); *H04L 45/74* (2013.01); *H04L 61/50* (2022.05); *H04L 2101/622* (2022.05)

(58) Field of Classification Search
CPC . H04L 45/50; H04L 61/6022; H04L 12/4641; H04L 45/66
See application file for complete search history.

(56) References Cited

U.S. PATENT DOCUMENTS

2019/0149462 A1* 5/2019 Semwal .............. H04L 12/4641
370/392

* cited by examiner

*Primary Examiner* — Abdelillah Elmejjarmi
(74) *Attorney, Agent, or Firm* — Fountainhead Law Group P.C.

(57) ABSTRACT

Techniques disclosed herein provide a method for configuring a network in DCI environment. An EVPN session is established between a first gateway device of a first network, and a second gateway device of a second network that are linked by L2 DCI link. An ESI is allocated for that EVPN session. A label is created for every combination of the ESI and media access control virtual routing and forwarding table (MAC VRF) that is locally configured at the first gateway device. An EVPN path is received for a host in the first network that is associated with MAC VRF. The path in imported the first MAC VRF by the first gateway device and exported via the inter-DCI EVPN session. The second gateway device identifies a label for MAC and re-exports it in local EVPN session with the identified label.

20 Claims, 5 Drawing Sheets

SYSTEMS AND METHOD FOR USING DCI-ESI TO BUILD HIGHLY SCALABLE EVPN DCI NETWORKS

CROSS-REFERENCE TO RELATED APPLICATIONS

This application claims priority to Greek Application No. 20200100670 filed on Nov. 6, 2020, and titled "Highly Scalable Evpn Dci Networks," by Ranpise et al., incorporated by reference herein as though set forth in full.

BACKGROUND

The present disclosure relates to efficient route propagation and routing in data center interconnect environment. In particular, the disclosure related to techniques for setting up EVPN sessions between gateway provider edge routers to improve scaling of networks in data center interconnect environment.

SUMMARY

In some computer networks, interconnected datacenters operate internal ethernet virtual private network (EVPN) sessions between devices in each respective datacenter. In such configurations, the datacenters may have layer 2 (L2) connectivity between each other, but do not have layer 3 (L3) connectivity outside of each individual datacenter. Each datacenter includes a gateway router via which all inter-datacenter traffic flows. The gateway router may be a gateway provider edge (GW-PE) device (e.g., configured as a virtual extensible local area network (VXLAN) tunnel endpoint (VTEP)). Each datacenter may further include additional routers, such as provided edges (PE), connected to the various hosts in the datacenter network.

Each datacenter may have an internally configured EVPN instance (EVI). Each EVI may further contain one or more layer 2 domain Virtual Land Area Networks (VLANs), each of these VLANs may have an associated Layer 3 Virtual routing and forwarding domain (VRF) with segregated routing tables. Each datacenter may include several PEs connected by a full mesh core connection or via a route reflector. Each PE may be directly connected to one or more hosts (e.g., virtual machine hosts). In this configuration, GW-PEs of the respective datacenters do not maintain an EVPN session with each other. Instead, a GW-PE learns routes to MAC addresses from remote datacenters on the Layer 2 datacenter interconnect link based on Ethernet packets in data plane and advertises the corresponding routes in the EVPN control plane of its datacenter. In some embodiments, the datacenter interconnect (DCI) links are enabled to act as trunk ports with all the VLANs enabled on the trunk port.

In typical operation, when devices in different datacenters discover each other, a GW-PE device will end up installing in its forwarding table all the learned media access control (MAC) addressees from all datacenters in all VLANs of its datacenter. Such an installation will have scaling consequences, especially as the number of interconnected datacenters is increased.

In particular, when a GW-PE receives a packet destined for a MAC address of a host in a different datacenter, it will have to ask for and an Internet protocol (IP) binding for the target MAC address. However, since GW-PE does not know which datacenter has the target host, it will have to bridge an Address Resolution Protocol (ARP) request to all datacenter it is connected to. This will result in the ARP request being flooded in all datacenters, even in those that do not include the target host. Similar flooding problem will occur with an unknown unicast packet. This problem cannot be solved by simply disabling unknown unicast flooding because each EVPN session is constrained within a single datacenter.

In this configuration performance inefficiencies may arise, for example, when two hosts (connected to two different PEs) in a first datacenter already established communication with each other. Since the two PEs in the local datacenter EVPN session known the locations of these two hosts, all PEs of that datacenter (including the GW-PE) will know the location of those hosts due to operation of the shared EVPN session. However, because GW-PE does not maintain an EVPN session with other GW-PE devices of other datacenters, the PE and GW-PE devices on remote datacenters will remain unaware of the location the two hosts until a communication to those hosts is requested.

For example, when a host from a second datacenter attempts to send a packet to the host in the first datacenter, that packet will be sent to PE connected to the host, and then flooded in the second datacenter, until it reaches GW-PE of that datacenter. The GW-PE of the second datacenter decapsulates the packet and bridges it to all other known GW-PE's (including both the first datacenter, and other datacenters). This will result in significant over-consumption of resources both due to flooding and due to sending the packet to datacenters that do not have the target host.

One approach to solving this problem is to extend the EVPN instance to devices in multiple datacenters, which would eliminate layer 2 datacenter links. However, this solution is burdensome since it requires a change of the entire deployment architecture. In particular, there would be a need to provision additional mechanisms so that the GW-PEs have L3 reachability between each other. Furthermore, this will require all GW-PEs to participate in every VLAN of every datacenter, which will mean that each GW-PE will need to have full control plane view of the entire later 2 network, which would require massive upscaling.

In another approach described herein, a hybrid solution is described herein that uses feature of both typical layer 2 handoff DCI architecture and extended EVPN architecture. In particular, EVPN sessions may be enabled specifically between GW-PEs of multiple datacenters, however the inter-datacenter traffic is still kept as plain layer 2 ethernet frames on layer 2 datacenter interconnect link. This approach offers multiple advantages. In particular, the requirement for the GW-PE to install MACs from remote datacenters is eliminated. Instead, in a local datacenter, the entire remote datacenter is represented with a single label in context of single bridge domain. The label can be a Multiprotocol Label Switching (MPLS) label or a Virtual Extensible LAN (VxLAN) identifier (VNI). This technique eliminates the scaling issues, and ensures that data plane packets (e.g., ARP packets) are not flooded across all datacenters (even those that do not include the target host). In addition, the requirement for ARP reply relay in layer 2 handoff model is also eliminated. This also lifts the restrictions with regards to attaching other network elements such as load balancers and firewalls to GW-PEs. This provides an added flexibility to design networks without such constraints.

The technique described herein are applied at several stages. First, EVPN sessions are established between all GW-PEs of the system. As part of this process, each layer 2 DCI link is assigned and Ethernet Segment Identifier (ESI), which is referred to hereinafter as DCI-ESI. This ESI value is associated with the EVPN session between two GW-PEs that are connected by that DCI link (e.g., a first and second GW-PEs). In addition, GW-PEs that share an EVPN instance are configured to handle EVIs and MAC VRFs they learn about. In particular, a first GW-PE and second GW-PEs are configured to have import and export route targets that ensure that when the first GW-PE learns about a MAC address that belongs to a certain VRF in the local EVPN session of the first datacenter, that MAC remains associated with the same VRF identifier when it is eventually exported into the local EVPN session of the second datacenter serviced by the second GW-PE.

Once the EVPN session is established between the first and second GW-PEs, the first GW-PE may allocate labels in control plane and program an associated hardware pair whenever it receives an Multiprotocol Label Switching (MPLS) packet from the local datacenter. For example, the first GW-PE may allocate an MPLS label or a VNI label for every combination of locally available DCI-ESI links and for each locally configured MAC VRF. For example, each label may be associated with a pair {DCI-ESI, MAC VRF}. For each such label, the GW-PE may also install in hardware a label for the pair of Layer 2 link (e.g., the DCI link underlying the DCI-ESI) and VLAN (e.g., VLAN corresponding to the MAC VRF). For example, the hardware of the first GW-PE may install a label for each combination of DCI link available to that GW-PE, and each VLAN of the local datacenter known that GW-PE.

In this way, whenever the first GW-PE receives a Border Gateway Protocol (BGP) update from the local datacenter, it programs that MAC address in its local table using the correct MAC VRF for that address. With this done, the first GW-PE is able to correctly forward traffic to that MAC address if such a traffic is received on the DCI link. Notably, the first GW-PE only installs MAC addresses received from the local datacenter. The first GW-PE may then advertise that MAC to a remote datacenter (e.g., to the second GW-PE) using the EVPN session configured between the first and second GW-PEs. When that MAC is exported into the EVPN session configured between the first and second GW-PEs, the values of Label field or Nexthop field are irrelevant and will not be used on the receiver PE. They can be set to 0 or to other invalid or valid values. Notably, however, these EVPN paths are advertised in a session associated with ES link between the first and second GW-PEs, and this ES has an ESI value associated with that EVPN session.

When the second GW-PE receives this EVPN route it imports it into correct MAC VRF based on which MAC VRF the original MAC address was associated with. Although the MAC addresses are imported, the second GW-PE does not install those MACs into its hardware. The second GW-PE will know the ESI of the link on which this EVPN route was received. It will also know the MAC VRF to which the MAC address belongs in the first datacenter. Since the second GW-PE knows both the ESI of the link and the correct MAC VRF, it can look up a previously allocated label for that combination of DCI-ESI and MAC VRF.

Once the label is looked-up, the second GW-PE can re-export the MAC into its local EVPN session on the second datacenter. In particular, the second GW-PE uses the looked-up label when generating an exported EVPN path for the MAC address to the local PEs in the second datacenter. The nexthop of the EVPN path for the MAC address may be set to local IP address. This EVPN path is then advertised to all PEs in the second datacenter.

Now all PEs in the second datacenter will be able to send traffic to the MAC address in the first datacenter using the label that is associated with the ESI of the correct DCI link (between the first and the second datacenters) and the correct MAC VRF in the first datacenter. In this way when the second GW-PE receives a packet from within the second datacenter, it can decapsulate the tunnel header, and use the tunnel label to identify the correct DCI link, and the correct VLAN tag for the packet. The second GW-PE is then able to bridge the packet on the correct DCI, while tagging that packet with the correct VLAN tag.

When the first GW-PE receives that packet on the DCI link, it can bridge that packet to the correct destination MAC address in the bridge table identified by the correct VLAN tag. This bridging may involve encapsulating the packet and sending it to tunnel end point identified by the bridge table entry. If the received packet is a known unicast or Broadcast, Unknown-unicast and multicast traffic (BUM) packet, the first GW-PE may flood the packet in its datacenter.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
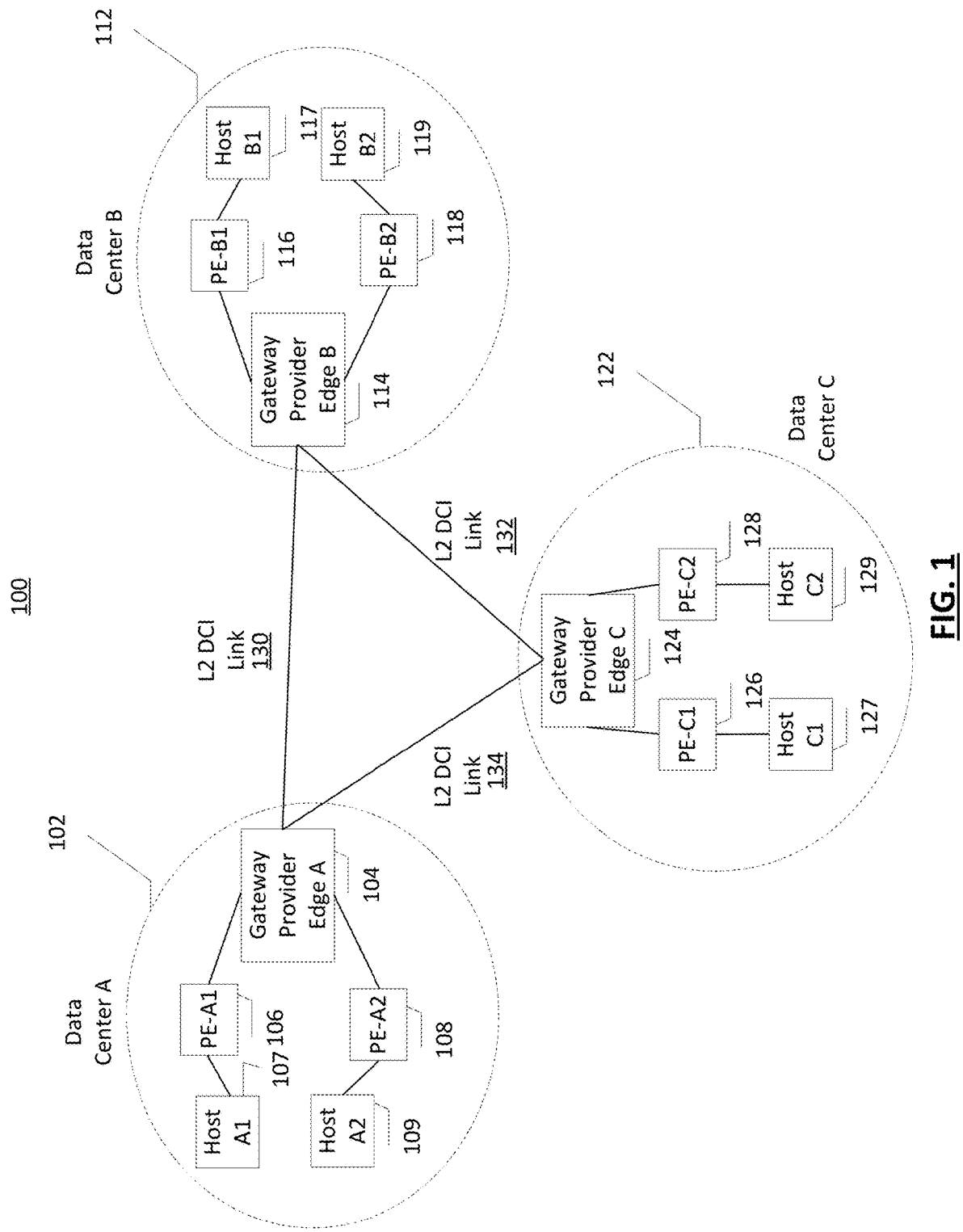
FIG. 1 shows an illustrative network topology of a system in a data center interconnect environment, in accordance with some embodiments of the disclosure.

FIG. 1 shows an illustrative diagram of system 100 for operations of a network in a DCI environment. System 100 is shown as having three data centers 102, 112, and 122, but any numbers of data centers may be connected in this manner. As shown, each pair of data centers 102, 112, and 122 may be connected by its own dedicated data center interconnect (DCI) link (e.g., Layer 2 DCI trunk port). For example, data centers 102 and 112 may be connected by DCI link 130, data centers 102 and 122 may be connected by DCI link 134, and data centers 112 and 122 may be connected by DCI link 132. In some embodiments, each of data centers 102, 112, and 122 may have an Ethernet Virtual Private Network (EVPN) configured for all devices (hosts and provider edges) within each respective data center. As shown, packets may traverse between data centers 102 and 152 in virtual ethernet frames with Virtual Local Area Network (VLAN) tag, and without any tunnel header on L2 DCI links 130, 132, and 134. In some embodiments, each EVPN session may also include be configured with a plurality of VLANS and MAC VRFs, e.g., as described in respect to FIG. 2.

Local EVPN sessions may be provisioned for each data center 102, 112, and 122 independently of each other. For example, all the hosts (e.g., hosts 107, and 109), provider edge (PE) devices (e.g., edge devices 106 and 108) and gateway provider edge (GW PE) devices (e.g., GW provider edge device 104) of data center 102 may be interconnected to each other in a first EVPN control plane. Similarly, all the hosts (e.g., hosts 117, and 119), provider edge (PE) devices (e.g., edge devices 116 and 118) and gateway provider edge (GW PE) devices (e.g., GW provider edge device 114) of data center 112 may be interconnected to each other in a second EVPN control plane. Moreover, all the hosts (e.g., hosts 127, and 129), provider edge (PE) devices (e.g., edge devices 126 and 128) and gateway provider edge (GW PE) devices (e.g., GW provider edge device 124) of data center 122 may be interconnected to each other in a third EVPN control plane.

Such a topology of system 100 has an advantage in that the PE devices in data center 102 do not maintain MAC address of any hosts (e.g., hosts 117, 127) from data centers 112 and 122 unless there is a cross data center communication required between a host in data center 102 with a host from one of data centers 112 or 122. Another advantage is that the EVPN domain stays small and Layer 3 reachability of the PE devices (e.g., devices 106, 108) stays contained within data center 102.

In some embodiments, links between hosts, PE devices, and GW devices may be an overlay of virtual links configured over an underlay of physical devices. In some embodiments, the underlay may be a mesh of devices. In some embodiments, hosts 107, 109, 117, 119, 127, and 129 may be virtual hosts controlled by a hypervisor.

In this configuration performance inefficiencies may arise, for example, when two hosts connected to two different PEs (e.g., host 107 connected to PE 106 and host 109 connected to PE 108) in datacenter 102 have already established communication with each other. Since PE 106 and 106 in the local datacenter EVPN session of data center 102 known the locations of these two hosts, all PEs of that datacenter (including the GW-PE) will know the location of those hosts due to operation of the shared EVPN session. However, because GW-PE 104 does not maintain an EVPN session with other GW-PE devices of other datacenters (e.g., GW-PE 114 and 124), the PE and GW-PE devices on remote datacenters (e.g., devices 114, 116m 1187, 124, 126, and 128) will remain unaware of the location the hosts 107 and 109 until a communication to those hosts is requested (e.g., by one of hosts 117 or 127).

For example, when host 112 from a datacenter 112 attempts to send a packet to host 107 in datacenter 102, that packet will be sent to PE connected to the host (PE 116), and then flooded in datacenter 112, until it reaches GW-PE 114. GW-PE 114 may decapsulate the packet and bridge it to all other known GW-Pes (i.e., GW-PE 104 and GW-PE 124). This will result in significant over-consumption of resources both due to flooding in general and due to sending the packet to data center 122 which does not even contain the target host 107.

One approach to solving this problem is to extend the EVPN instance to devices in all datacenters 102, 112 and 122, which would eliminate layer 2 datacenter links 130, 134, and 132. However, this solution is burdensome since it requires a change of the entire deployment architecture. In particular, there would be a need to provision additional mechanisms so that the GW-PEs 104, 114, and 124 have L3 reachability between each other. Furthermore, this will require all GW-PEs to participate in every VLAN of every datacenter 102, 112, and 122, which will mean that each GW-PE will need to have full control plane view of the entire later 2 network, which would require massive upscaling.

To solve this problem, a hybrid approach solution is disclosed herein that uses features of both typical layer 2 handoff DCI architecture and extended EVPN architecture. In particular, EVPN sessions are configured and enabled specifically between GW-PEs of multiple datacenters (e.g., between each pair of GW-PEs104, 114, and 124). In some embodiments, the inter-datacenter traffic is still kept as plain layer 2 ethernet frames on layer 2 datacenter interconnect links between each pair of GW-PEs 104, 114, and 124.

This approach offers multiple advantages. In particular, the requirement for each GW-PE 104, 114, and 124 to install MACs from remote datacenters is eliminated. Instead, in a local datacenter (e.g., data center 102), each entire remote datacenter (e.g., each of remote datacenters 112 and 122) is represented with a single label in context of single bridge domain. The label can be a Multiprotocol Label Switching (MPLS) label or a Virtual Extensible LAN (VxLAN) identifier (VNI). This technique eliminates the scaling issues, and also ensures that data plane packets (e.g., ARP packets) are not flooded across all datacenters (even those that do not include the target host). In addition, the requirement for ARP reply relay in layer 2 handoff model is also eliminated. This also lifts the restrictions with regards to attaching other network elements such as load balancers and firewalls to GW-PEs. This provides an added flexibility to design networks without such constraints.

To achieve this configuration, first EVPN sessions are established between all GW-PEs of the system. For example, a first EVPN session may be enabled between GW-PEs 104 and 114, a second EVPN session may be enabled between GW-PEs 104 and 124, and a third EVPN session may be enabled between GW-PEs 114 and 124. Each layer 2 DCI link is assigned unique Ethernet Segment Identifier (ESI), which is referred to hereinafter as DCI-ESI. This ESI value is associated with the EVPN session between two GW-PEs that are connected by that DCI link (e.g., a first and second GW-PEs). For example, EVPN session between GW-PEs 104 and 114 maybe assigned ESI 1, EVPN session between GW-PEs 104 and 124 may be assigned ESI 2, and EVPN session between GW-PEs 114 and 124 maybe assigned ESI 3.

In addition, two GW-PEs that share an EVPN instance (e.g., GW-PEs 104 and 114) are configured to handle EVIs and MAC VRFs they learn about in respective local EVPN sessions (e.g., EVIs and MAC VRFs in EVPN session between devices in data centers 102 and 112). In particular, a GW-PE 104 and GW-PEs 114 are configured to have import and export route targets that ensure that when the GW-PE 104 learns about a MAC address that belongs to a certain VRF in the local EVPN session of datacenter 102, that MAC remains associated with the same VRF identifier when it is eventually exported into the local EVPN session of datacenter 112 serviced by GW-PE 114.

When such an EVPN session is established between GW-PEs 104 and 114, it may be assigned a unique ESI (e.g., ESI 1). Similarly, such an EVPN session is established between GW-PEs 104 and 124, it may be assigned a unique ESI (e.g., ESI 2). This may be done for every pair of GW-PEs.

Further, GW-PEs 104 and 114 may allocate labels in control plane (e.g., of the newly established EVPN session) and program an associated hardware pair whenever it receives an MPLS packet from datacenter 104 (e.g., from hosts 107, 109 via PE 106 or PE 108). In some embodiments, the GW-PE 104 may allocate an MPLS label or a VNI label for every combination of locally available DCI-ESI links (e.g., links to GW-PE 114 and 124 over respective EVPN session) and for each locally configured MAC VRF. For example, a label L1 may be associated with a pair {DCI-ESI, MAC VRF}. For example, if a packet is received by GW-PE 104 that refences MAC VRF 1, GW-PE may create label L1 that is associated with {ESI 1, MAC VRF 1}, where ESI 1 is a DCI-ESI tag associated with an EVPN session between GW-PEs 104 and 114. GW-PE may create label L2 that is associated with {ESI 2, MAC VRF 1}, where ESI 2 is a DCI-ESI tag associated with an EVPN session between GW-PEs 104 and 124.

For each such label (e.g., L1 and L2), GW-PE 104 may also install in its hardware a label for the pair of Layer 2 link (e.g., the DCI link underlying the DCI-ESI) and VLAN (e.g., VLAN corresponding to the MAC VRF). In some embodiments, the hardware of the first GW-PE may install a label for each combination of DCI link available to that GW-PE, and each VLAN of the local datacenter known that GW-PE. For example, for label L1, GW-PE 104 may install a label into its hardware for {L2 DCI Link 130, VNI 1}, where VNI 1 is a VLAN identifier of a VLAN associated with MAC VRF 1.

In this way, whenever the GW-PE 104 receives a Border Gateway Protocol (BGP) update (e.g., including a MAC address of a host) from a device in local datacenter 102, GW-PE 104 programs that MAC address in its local table using the correct MAC VRF associated with that address. With this done, the GW-PE 104 is able to correctly forward traffic to that MAC address if such a traffic is received on DCI link 130 or DCI link 134. Notably, the GW-PE only installs MAC addresses received from local datacenter 102. Once MAC address is installed, GW-PE advertises that MAC to remote datacenters (e.g., GW-PE 114 and 124) using the appropriate EVPN session. For example, an EVPN session between GW-PE 104 and 114 is used to advertise MAC addressed to GW-PE 114.

When that MAC address (e.g., MAC address of host 107 associated with MAC VRF 1) is exported into the EVPN session configured between the first and second GW-PEs 104 and 114, the values of Label field or Nexthop field are irrelevant and will not be used on the receiver GW-PE (e.g., GW-PE 114). In some embodiments, such fields can be set to 0 or to any other invalid or valid values. In some embodiments, an EVPN paths for this MAC address is then advertised in the EVPN session configured between the first and second GW-PEs 104 and 114 (e.g., a session with tag ESI 1).

When the GW-PE 114 receives this EVPN route it imports it into a correct MAC VRF (local to datacenter 112) based on which MAC VRF the original MAC address was associated with (e.g., MAC VRF 1). Although the MAC address is imported, GW-PE 114 does not install this MACs into its hardware. In this way, GW-PE 114 comprises information regarding the ESI of the link on which this EVPN route was received (e.g., ESI 1). GW-PE 114 will also comprise information regarding the MAC VRF to which the MAC address belongs in the first datacenter (e.g., MAC VRF 1). Since GW-PE 114 comprises information identifying both the ESI of the link (e.g., ESI 1) and the correct MAC VRF (e.g., MAC VRF 1), GW-PE 114 can look up a previously allocated label for that combination of DCI-ESI and MAC VRF (e.g., label L1).

Once the label L1 is looked-up, GW-PE 114 re-export the MAC into its local EVPN session of datacenter 112. In particular, GW-PE 112 uses the looked-up label (e.g., label L1) when generating an exported EVPN path for the MAC address to the local PEs in datacenter 112 (e.g., PEs 116 and 118). The nexthop of the EVPN path for the MAC address may be set by GW-PE 112 to a local IP address. This EVPN path is then advertised to all PEs in datacenter 112 (e.g., PEs 116 and 118).

In this way, whenever a packet needs to get sent host 107 by any of PEs in data center 112 (e.g., by PE 116), PE 116 is able to send traffic to the MAC address of host 107 using the label (e.g., label L1) that is associated with the ESI of the correct DCI link (e.g., ESI 1) and the correct MAC VRF in the first datacenter (e.g., MAC VRF 1). When GW-PE 114 receives a packet destined for MAC address of host 107 from within the second datacenter (e.g., from PE 116), GW-PE 114 decapsulates the tunnel header, and uses the tunnel label (e.g., Label L1) to identify the correct DCI link (e.g., DCI link associated with ESI 1), and the correct VLAN tag for the packet. The second GW-PE is then able to bridge the packet on the correct DCI (e.g., DCI 130), while tagging that packet with the correct VLAN tag (e.g., VLAN tag associated with MAC VRF 1). Notably, the packet is not bridged to GW-PE 124 over DCI 13, which results in improvement of packet routing and bridging and avoids consumption of networking and computation resources by GW-PE 124 and other devices in data center 122 that do not have a host with destination MAC address.

When GW-PE 104 receives that packet on DCI link 130, it can bridge that packet to the correct destination MAC address in the bridge table identified by the correct VLAN tag. This bridging may involve encapsulating the packet and sending it to tunnel end point identified by the bridge table entry. If the received packet is a known unicast or Broadcast, Unknown-unicast and multicast traffic (BUM) packet, the first GW-PE may flood the packet in its datacenter.

While the above description related to pair GW-PE 104, 114, one skilled in the art would appreciate that similar steps can be performed for pair GW-PE 104, 14 and pair GW-PE 114, 124.

Figure 2:
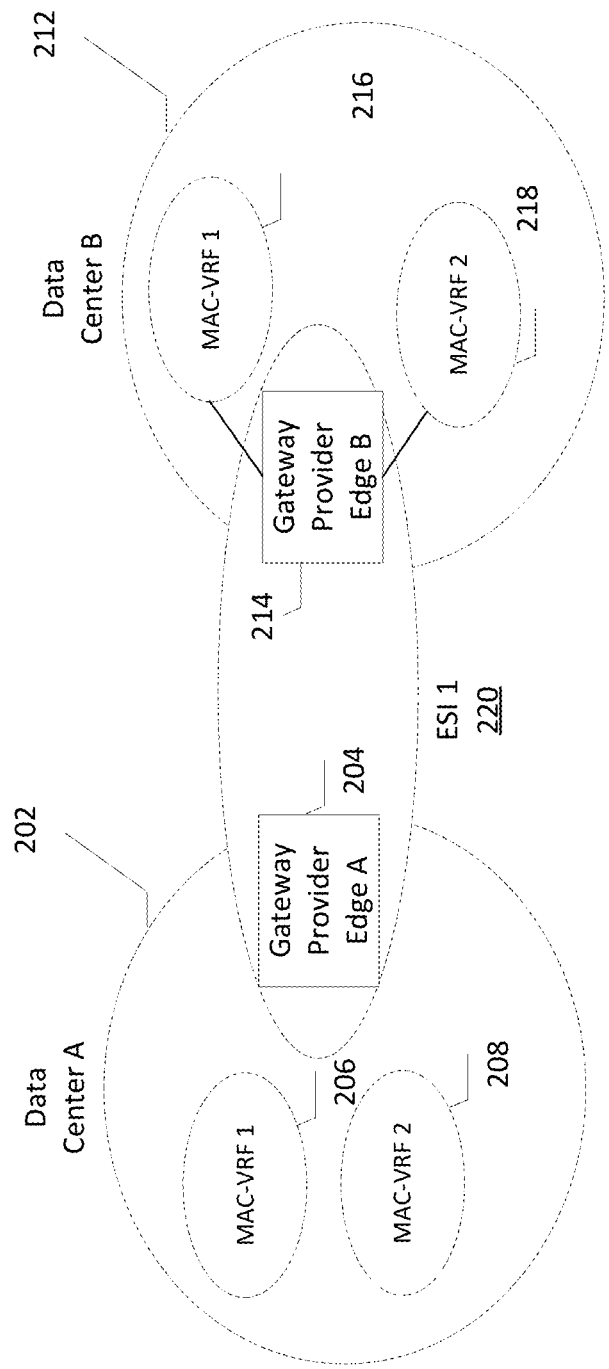
FIG. 2 shows another illustrative network topology of a system in a data center interconnect environment, in accordance with some embodiments of the disclosure.

FIG. 2 shows an illustrative diagram of system 200 for operations of a network in a DCI environment. In some embodiments data center 202 may be the same as data center 102, and data center 212 may be the same as data center 112. Additionally, GW-PE 204 may be the same as GW-PE 104, and GW-PE 214 may be the same as GW-PE 114.

In some embodiments, GW-PEs 204 and 214 may be connected via a layer 2 DCI link (e.g., link 130). FIG. 2 illustrates that an EVPN session 200 may be configured between GW-PEs 204 and 214 and assigned an Ethernet segment identifier ESI 1. As described in relation to FIG. 1 data center 202 may include multiple hosts and PE devices, configured into a plurality MAC VRFs (e.g., MAC VRF 1 206 and MAC VRF 2 208) in EVPN session that is internal to data center 202.

When EVPN session 200 is established, GW-PE 204 allocates labels in control plane of EVPN session 220 whenever it receives an MPLS packet from the local datacenter 202. For example, each label may be associated with a pair {DCI-ESI, MAC VRF}. In that way GW-PE 204 may allocate label L1 to pair {ESI 1, MAC VRF 1} and label L2 to pair {ESI 1, MAC VRF 2}.

Whenever GW-PE 204 receives a Border Gateway Protocol (BGP) update from local datacenter 202 for a certain MAC address, it programs that MAC address in its local table using the correct MAC VRF for that address (e.g., using one of MAC VRF 1 or MAC VRF 2). Then GW-PE 204 advertise that MAC address to GW-PE 214 using EVPN session 200. When that MAC is exported into the EVPN session 200, it is advertised in a session associated with ESI 1 tag. When GW-PE 214 receives this advertisement route it imports it into correct MAC VRF based on which MAC VRF the original MAC address was associated with. That is if the MAC address was associated with MAC VRF 1 in data center 202, GW-PE 214 import that MAC into MAC VRF 1 216, and not into MAC VRF 2 218. GW-PE 214 does not install this MACs into its hardware, however.

Moreover, GW-PE 214 knows that the mac address was received over a link with ESI 1 and it also knows which MAC VRF that MAC address is associated with (e.g., MAC VRF 1). Since GW-PE 214 is aware of pair {ESI 1, MAC VRF 1}, it is able to look up correct label for this pair (L1). GW-PE 214 now reexports the MAC into its local EVPN session of datacenter 212. In particular, GW-PE 214 uses the looked-up label (e.g., label L1) when generating an exported EVPN path for the MAC address to the local PEs in datacenter 212.

In this way all if a PE in data center 212 needs to send a packet to the MAC address it can do so while referencing label L1. When GW-PE 214 receives a packet with label L1, it can look up correct pair {ESI 1, MAC VRF 1}, and bridges that packet only to GW-PE 204 and not to any other GW-PE. It can also, before bridging, tag the packer using correct VLAN ID (e.g., VNI) associated with MAC VRF 1. This tag can be used by GW-PE 204 to bridge the packet to correct MAC address which further simplifies and improves packet delivery.

Figure 3:
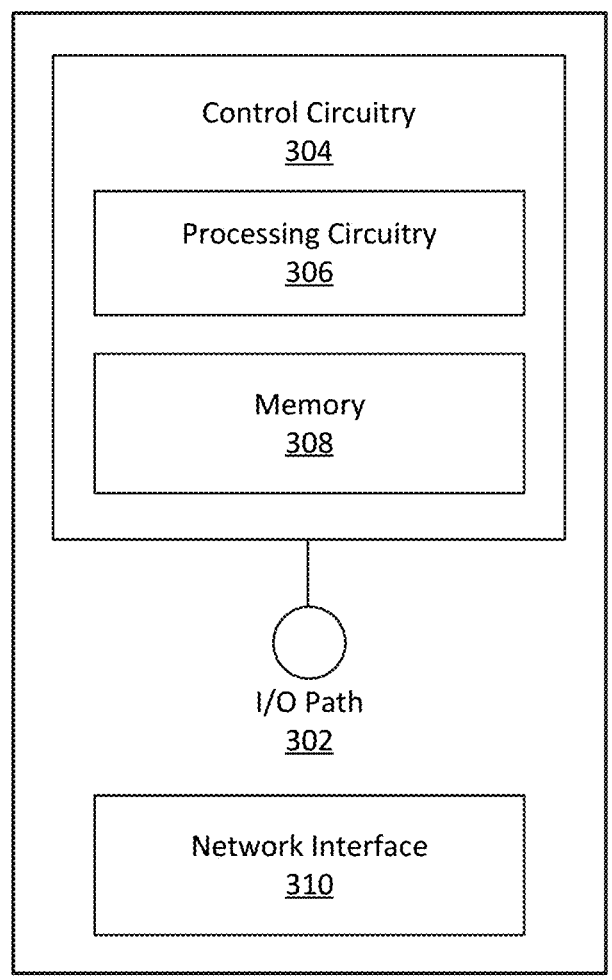
FIG. 3 shows a diagram of an illustrative network device for synchronization of an ARP binding, in accordance with some embodiments of the disclosure.

FIG. 3 shows a generalized embodiment of a network device usable in a system with DCI links, in accordance with some embodiments of the disclosure. In particular, device 300 of FIG. 3 may be any of the devices depicted in FIGS. 1 and 2 (e.g., devices 102, 104, 106-109, 112, 114, 116-119, 122, 124, 126-129, 204, 214) or may a physical or virtual device hosting any of physical or virtual devices 102, 104, 106-109, 112, 114, 116-119, 122, 124, 126-129, 204, 214. Device 300 may be a router, an L3 switch, an L2 router, or a host, and/or any other computing device that may be configured to participate in propagation of ARP bindings. Device 300 may receive data at network interfaces 310 and provide the received data to control circuitry 304 via an input/output (I/O) path 302. Control circuitry 304 includes processing circuitry 306 and storage 308. Storage 308 may include volatile memory 330 (such as random-access memory (RAM), for example, static RAM and/or dynamic RAM), which does not retain its contents when power is turned off, and non-volatile memory 332 (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to network interface 310, which in turn connect device 300 to one or more other devices. For example, I/O path 302 may propagate packets or EVPN routes for MAC addresses.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions suitable to implement any of the techniques described above or below.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 308 may include labels of the format {DCI-ESI, MAC VRF} or {DCI link ID, VLAN identifier} that are generated as described above. Multiple circuits may be provided to handle simultaneous processing functions. In some embodiments, device 300 may be a virtual device, wherein components 304, 306, 308, 302 and 310 are virialized on top of another physical device.

Figure 4:
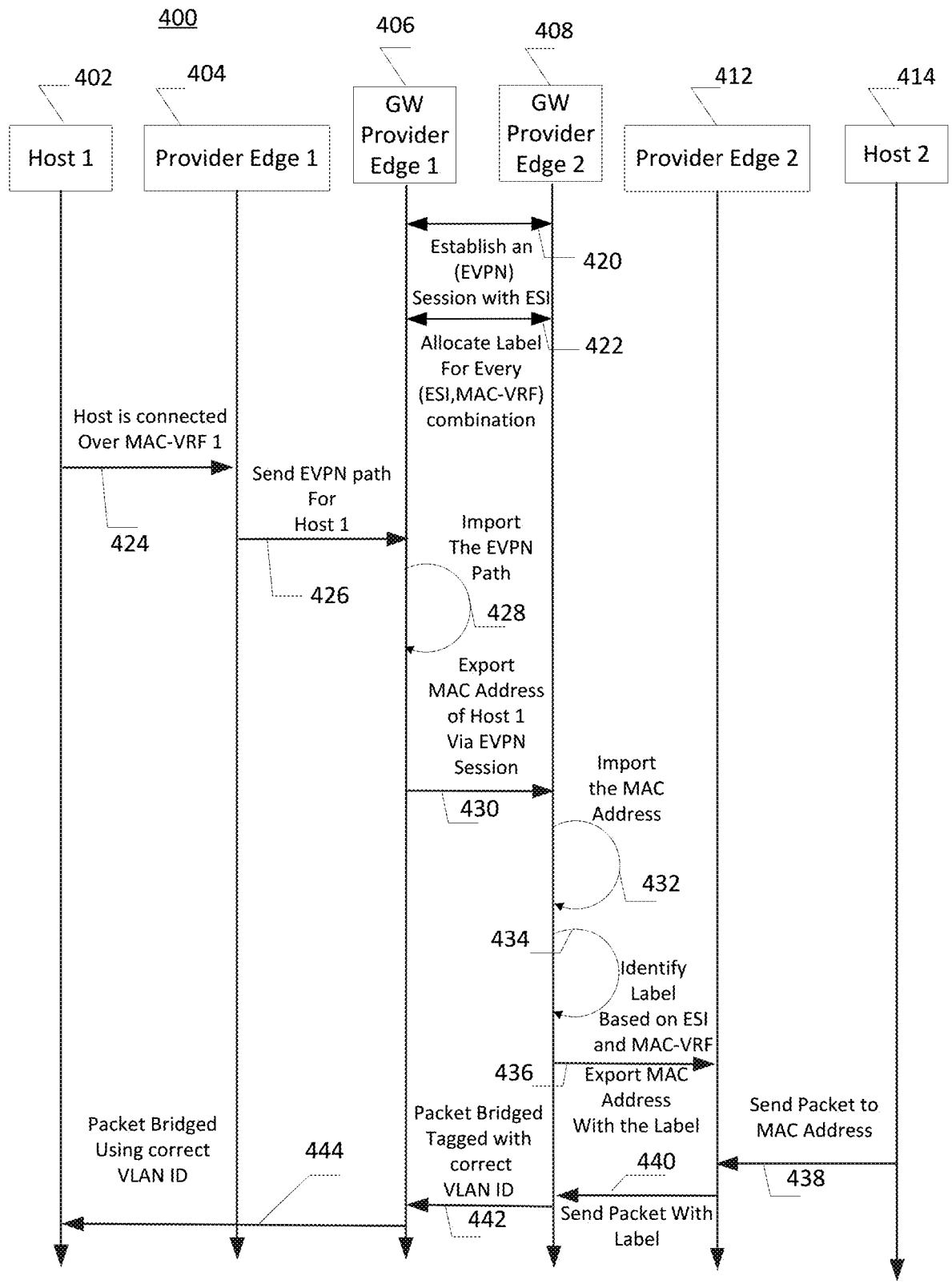
FIG. 4 is a flowchart of an illustrative process operation of a network in a data center interconnect environment, in accordance with some embodiments of the present disclosure.

FIG. 4 is a flowchart of an illustrative process for establishing efficient topology for a network with DCI interconnect links, e.g., in routing architecture 100 (e.g., as illustrated by system 100 of FIG. 1).

In some embodiments, the topology may involve hosts 402 and 414 (which may be the same as hosts 107 and 117), Provider Edges 404 and 412 (which may be the same as PEs 106 and 116) and Gatewayed Provider edges 406 and 408 (which may be the same as GE PEs 104 and 114). In some embodiments, Hosts 402 may have a MAC address that belongs to a certain MAC VRF (e.g., MAC VRF 206). The MAC VRF may be associated with VLAN identifier (e.g., VNI 1). In some embodiments, one EVPN session may be maintained for host 404, PE 404, and GW PE 406 (e.g., because the devices are in a single data center) and another EVPN session may maintained for host 408, PE 412, and GW PE 414. GW PEs 406 and 408 may be connected by a DCI interconnect link (which may have DCI link ID).

At step 420, control circuitry (e.g., control circuitry of one or both of GW PEs 406 and 408) may establish a new EVPN session between GW PEs 406 and 408. This new session may be allocated an ESI tag (e.g., ESI 1). At step 422, the control circuitry may allocate labels in control plane (of the new EVPN session) and program an associated hardware pair (e.g., in hardware of one or both of GW PEs 406 and 408) whenever an MPLS packet is received from a local datacenter (e.g., data center contain host 402). For example, control circuitry of GW-PE 406 may allocate a label that is uniquely identified with a pair {ESI, MAC VRF}. GW-PE 406 may also store in its hardware a related label for a pair {DCI link ID, VNI 1} that is related to pair {ESI, MAC VRF}. Such labels may be allocated for every combination of DCI EVPN session and MAC VRFs known to GW PEs 406.

At step 424, host 1 may inform PE 404 that it is connected via MAC-VRF 1. At step 426 PE 404 may send a BPG update to GW-PE 406 that includes MAC address of host 402 and information that MAC address of host 402 is associated with MAC VRF 1. At 428, GW PEs 406 imports that MAC in its local table with correct MAC-VRF 1.

At 430, GW-PE 406 advertises that MAC to GW-PE 408 using the EVPN session configured at step 420 that has ESI tag ESI 1. In some embodiments, the tag (i.e., ESI 1) may have been configured for the DCI link (e.g., a layer 2 link between GW PE 406 and GW PE 508) on which the EVPN session is established. At 432, GW-PE 408 receives this EVPN route export, it notes that it was received via connection that has ESI tag ESI 1. It also notes that the EVPN route export identifies MAC-VRF 1. In this way GW-PE 408 constructs pair {ESI1, MAC VRF 1} and uses it to look up the associated labels at step 434. GW-PE 408 then imports the route but does not program the MAC address into its hardware table.

At 436, GW-PE 408 exports the MAC address into its local EVPN session (e.g., session with PE 412) with the label looked up at step 434. This enables PE 412 to be able to send traffic destined for the MAC address using the label used in the export step 436.

For example, at step 438 host 414 may send a packet to the MAC address of host 402. This packet is received by PE 412. At step 440, PE 412 sends the packet to GW PE 408 with the correct label. GW PE 408 is then able to use the label to look up both {ESI, MAC VRF} and {DCI link ID, VNI 1}. In this way GW PE 408, learns that the packet should only be bridged via DCI link associated with the DCI link ID, and not via other DCI links. At step 442, GW PE 408 bridges the packet via the DCI link, while tagging the packet with a correct VLAN tag (e.g., VNI 1). In this way, at step 442, GW PE 406 is able to correctly bridge the packet to host 402 using correct MAC address in the bridge table identified by the correct VLAN tag. This bridging may involve encapsulating the packet and sending it to tunnel end point identified by the bridge table entry. If the received packet is a known unicast or Broadcast, Unknown-unicast and multicast traffic (BUM) packet, the first GW-PE may flood the packet in its datacenter.

Figure 5:
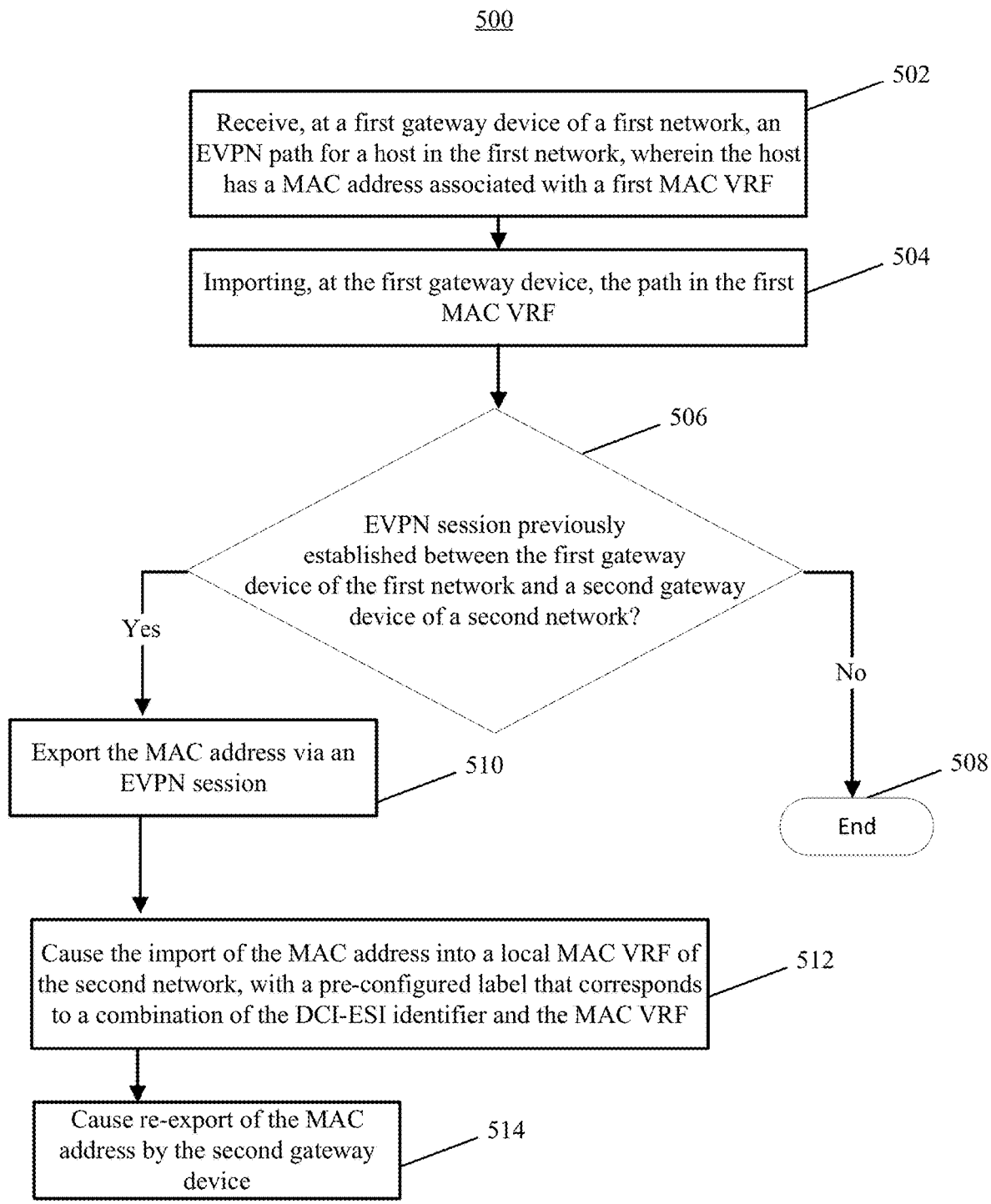
FIG. 5 is another flowchart of an illustrative process operation of a network in a data center interconnect environment, in accordance with some embodiments of the present disclosure.

FIG. 5 is a flowchart of an illustrative process for setting up network architecture in a DCI environment, in accordance with some embodiments of the present disclosure. Process 500 may be performed by physical or virtual control circuitry, such as control circuitry 304 of device 300 (FIG. 3). For example, process 500 may be performed by control circuitry of GW PE 406 of FIG. 4.

At 502, the control circuitry of the gateway device (e.g., GW PE 406) receives, via a first network (e.g., EVPN session in data center102), an EVPN path for a host (e.g., hoist 107) in the first network, wherein the host has a MAC address associated with a first MAC VRF.

At 504, the control circuitry imports, at the first gateway device, the path in the first MAC VRF. The control circuitry, may also, at the first gateway device program that MAC address in the local table of the first gateway device using the correct MAC VRF for that address.

At 506, the control circuitry of the gateway device may check whether a special EVPN session was previously established between the first gateway device of the first network and a second gateway device of a second network. For example, EVPN session may have been established as describes in relation to strep 420 of FIG. 4. Additionally, when the EVPN session was established, control circuitry of the gateway device may have allocated labels for every combination of locally available DCI-ESI links and for each locally configured MAC VRF. Each such label may also have an associated label installed into hardware that mapped to a pair of DCI layer 2 link identifier and VLAN identifier (associated with the MAC VRF). If no such EVPN connection was established, process 500 ends at 508. If the EVPN connection was established process 500 continues at 510.

At 510, the control circuitry of the gateway device may export the MAC address via an EVPN session that was previously established between the first gateway device of the first network and a second gateway device of a second network. The export may identity the MAC VRF associated with the MAC address.

At 512, the export that occurred at step 510 may cause the second gateway device to import the MAC address into a local MAC VRF of the second network, with a pre-configured label that corresponds to a combination of the ESI of the EVPN session and the MAC VRF of the MAC address.

At 514, the export that occurred at step 510 may cause the second gateway device to re-export the MAC address into its local EVPN session with the identified label. In some embodiments, the MAC addressed is re-exported with a label that corresponds to a combination of DCI-ESI identifier and an identifier of the MAC VRF. This may cause other PE devices in the local EVPN session of the second gateway to learn the label associated with the MAC address. The knowledge may cause efficient bridging of a packet destined to the MAC address and originating from any host in the local EVPN of the second gateway device (e.g., as described in steps 438-444 of FIG. 4).

While the processes 400 and 500 described above illustrate a single iteration of importing and re-exporting a MAC address, those skilled in the art will appreciate that these processes may be iteratively repeated for multiple MAC addresses imported and re-exported via multipole EVPN sessions between multiple GW-PEs of multiple data centers connected by multipole DCI links. The processes 400 and 500 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other suitable embodiment herein, and flowcharts or examples relating to one embodiment may be combined with any other suitable embodiment in a suitable manner, done in different orders, or done in parallel. In addition, the systems and methods described herein may be performed in real time. It should also be noted that the systems and/or methods described above may be applied to, or used in accordance with, other suitable systems and/or methods.

It will be apparent to those of ordinary skill in the art that methods involved in the present disclosure may be embodied in a computer program product that includes a non-transitory computer-usable and/or-readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method for forwarding traffic, the method comprising:
   establishing an ethernet virtual private network (EVPN) session between a first gateway device of a first network in a first datacenter, and a second gateway device of a second network in a second datacenter, wherein the first gateway device and the second device are connected by a layer 2 datacenter interconnect link;
   allocating an ethernet segment identifier (ESI) for the EVPN session;
   generating a label for every combination of the ESI and media access control virtual routing and forwarding table (MAC VRF) that is locally configured at the first gateway device;
   receiving, at the first gateway device, an EVPN path for a host in the first network, wherein the host has a MAC address associated with a first MAC VRF;
   importing, at the first gateway device, the path in the first MAC VRF;
   exporting the MAC address via the EVPN session between the first gateway device of the first network and the second gateway device of the second network;
   importing, at the second gateway device, the exported MAC address;
   identifying a label that corresponds to the ESI of the EVPN session on which the MAC address was received and the MAC VRF of the MAC address;
   exporting, by the second gateway device, the MAC address into an EVPN session of the second network, with the identified label.

2. The method of claim 1, wherein the second gateway device does not locally install the MAC address.

3. The method of claim 1, wherein each label for combination of the ESI and MAC VRF is also associated with a corresponding combination of a layer 2 datacenter interconnect link and a VLAN identifier.

4. The method of claim 3, further comprising:
   receiving, at the second gateway device, a packet addressed to the MAC address of the host in the first network from a device in the second network;
   identifying, at the second gateway device, a destination layer 2 datacenter interconnect link and a destination VLAN identifier based on the label of the packet; and
   bridging the packet along the identified destination layer 2 datacenter interconnect link, wherein the bridged packet includes the VLAN identifier.

5. The method of claim 4, further comprising:
   receiving, at the first gateway device, a packet addressed to the MAC address of the host in the first network via the layer 2 datacenter interconnect link; and
   bridging the packet to the destination MAC address using a bridging table identified by the VLAN identifier.

6. A method for forwarding traffic, the method comprising:
   receiving, at a first gateway device of a first network, an EVPN path for a host in the first network, wherein the host has a MAC address associated with a first MAC VRF;
   importing, at the first gateway device, the path in the first MAC VRF;
   exporting the MAC address via an EVPN session that was previously established between the first gateway device of the first network and a second gateway device of a second network,
   wherein:
   the MAC address is further configured to be exported into a local EVPN session of the second network, with a pre-configured label that corresponds to a combination of an ESI of the EVPN session and the MAC VRF of the MAC address; and
   the MAC address is configured to be imported by the second gateway device.

7. The method of claim 6, wherein the second gateway device is configured not to install the received MAC address.

8. The method of claim 6, wherein the second gateway device is configured to install in its hardware a local label associated with a combination of a layer 2 link and a VLAN identifier that is associated with the ESI of the EVPN session and the MAC VRF of the MAC address.

9. The method of claim 8, further comprising:
   receiving, via the layer 2 link, a packet addressed to the MAC address of the host in the first network; and
   bridging the packet to a destination MAC address using a bridging table identified by the VLAN identifier.

10. The method of claim 9, wherein the second gateway device is configured to bridge a packet received via the EVPN session that was previously established between the first gateway device of the first network and a second gateway device of a second network using the combination of a layer 2 link identifier and a VLAN identifier.

11. A system for forwarding traffic, the system comprising:
    control circuitry of a first gateway device configured to:
      establishing an ethernet virtual private network (EVPN) session between the first gateway device of a first network in a first datacenter, and a second gateway device of a second network in a second datacenter, wherein the first gateway device and the second device are connected by a layer 2 datacenter interconnect link;
      allocate an ethernet segment identifier (ESI) for the EVPN session;
      generate a label for every combination of the ESI and media access control virtual routing and forwarding table (MAC VRF) that is locally configured at the first gateway device;
    input/output circuitry of the first gateway device configured to:
      receive an EVPN path for a host in the first network, wherein the host has a MAC address associated with a first MAC VRF;
    wherein the control circuitry of the first gateway device if further configured to:
      importing the path in the first MAC VRF on the first gateway device; and
      export the MAC address via the EVPN session between the first gateway device of the first network and the second gateway device of the second network; and
    control circuitry of the second gateway device configured to:
      import the exported MAC address;
      identify a label that corresponds to the ESI of the EVPN session on which the MAC address was received and the MAC VRF of the MAC address; and
      export the MAC address into an EVPN session of the second network, with the identified label.

12. The system of claim 11, wherein the second gateway device is configured not to locally install the MAC address.

13. The system of claim 11, wherein each label for combination of the ESI and MAC VRF is also associated with a corresponding combination of a layer 2 datacenter interconnect link and a VLAN identifier.

14. The system of claim 13, wherein the control circuitry of the second gateway device is further configured to:
receive a packet addressed to the MAC address of the host in the first network from a device in the second network;
identify a destination layer 2 datacenter interconnect link and a destination VLAN identifier based on the label of the packet; and
bridge the packet along the identified destination layer 2 datacenter interconnect link, wherein the bridged packet includes the VLAN identifier.

15. The system of claim 14, wherein the control circuitry of the first gateway device is further configured to:
receive a packet addressed to the MAC address of the host in the first network via the layer 2 datacenter interconnect link; and
bridge the packet to the destination MAC address using a bridging table identified by the VLAN identifier.

16. A system for forwarding traffic, the system comprising:
an input/output circuitry of a first gateway device of a first network configured to:
receive an EVPN path for a host in the first network, wherein the host has a MAC address associated with a first MAC VRF; and
a control circuitry of the first gateway device configured to:
importin the path in the first MAC VRF;
export the MAC address via an EVPN session that was previously established between the first gateway device of the first network and a second gateway device of a second network,
cause the MAC address to be exported into a local EVPN session of the second network, with a pre-configured label that corresponds to a combination of an ESI of the EVPN session and the MAC VRF of the MAC address; and
cause the MAC address to be imported by the second gateway device.

17. The system of claim 16, wherein the second gateway device is configured not to install the received MAC address.

18. The system of claim 16, wherein the second gateway device is configured to install in its hardware a local label associated with a combination of a layer 2 link and a VLAN identifier that is associated with the ESI of the EVPN session and the MAC VRF of the MAC address.

19. The system of claim 18, wherein:
the control circuitry of the first gateway device is configured to:
receive, via the layer 2 link, a packet addressed to the MAC address of the host in the first network; and
bridge the packet to a destination MAC address using a bridging table identified by the VLAN identifier.

20. The system of claim 19, wherein control circuitry of the second gateway device is configured to:
bridge a packet received via the EVPN session that was previously established between the first gateway device of the first network and a second gateway device of a second network using the combination of a layer 2 link identifier and a VLAN identifier.

* * * * *